United States Patent [19]

Harris

[11] Patent Number: 4,699,638

[45] Date of Patent: Oct. 13, 1987

[54] TWO-STAGE ROLL-OVER VALVE

[75] Inventor: Robert S. Harris, Connersville, Ind.

[73] Assignee: Stant Inc., Connersville, Ind.

[21] Appl. No.: 946,581

[22] Filed: Dec. 24, 1986

Related U.S. Application Data

[63] Continuation-in-part of Ser. No. 846,081, Mar. 31, 1986.

[51] Int. Cl.[4] ............................................. B01D 53/02
[52] U.S. Cl. ......................................... 55/168; 55/88; 55/182; 141/286; 220/85 VR; 220/86 R
[58] Field of Search ................... 55/88, 182, 387, 165, 55/168; 141/44, 45, 286, 302; 220/85 VR, 86 R, 85 VS

[56] References Cited

U.S. PATENT DOCUMENTS 3,617,034 11/1971 Skinner ...................... 220/85 VS X
4,261,477 4/1981 Casimir et al. ................ 220/85 VR Primary Examiner—Charles Hart
Attorney, Agent, or Firm—Barnes & Thornburg

[57] ABSTRACT

A system is provided for recovering fuel vapors discharged from a vehicle fuel system during refueling. The vehicle fuel system including a fuel tank having a filler neck and a separate outlet. The system includes a venting module mounted in the outlet and configured to divide the outlet into separate first and second fuel vapor flow ports. Pressurized fuel vapor in the fuel tank is exhaustable therefrom through at least one of the first and second ports. The venting module includes a first chamber inside the first tank and a second chamber outside the fuel tank. A vapor delivery system conducts fuel vapor from the first and second ports to a fuel vapor treatment site. A roll-over valve assembly in the first chamber selectively blocks the flow of fuel vapors through the first fuel vapor flow port during vehicle rollover or the like. A vapor recovery valve assembly in the second chamber selectively regulates the flow of fuel vapors through the second fuel vapor flow port so that fuel vapor in the fuel tank can be discharged through the fuel tank outlet and recovered at the fuel vapor treatment site during vehicle refueling.

30 Claims, 11 Drawing Figures

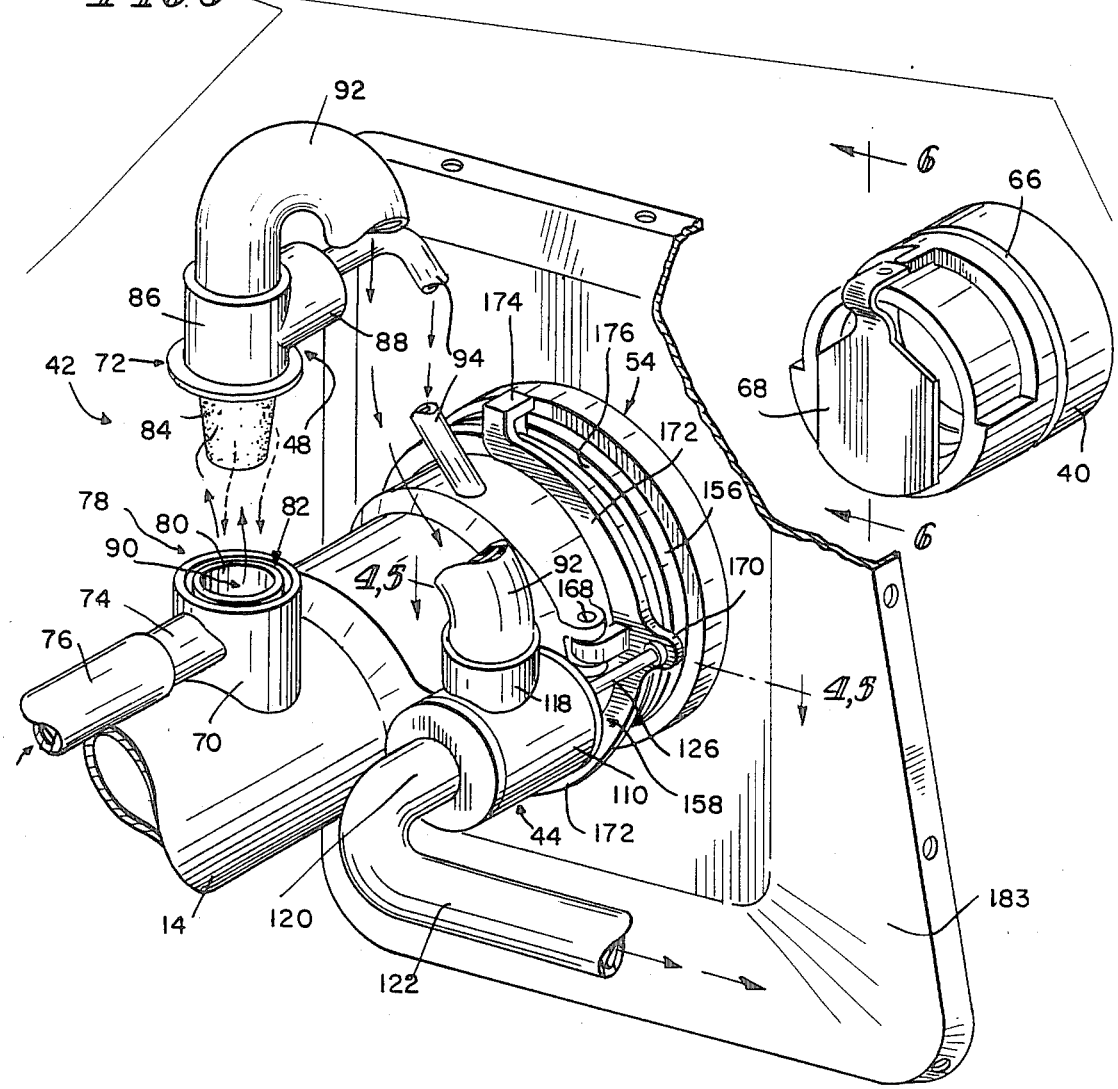
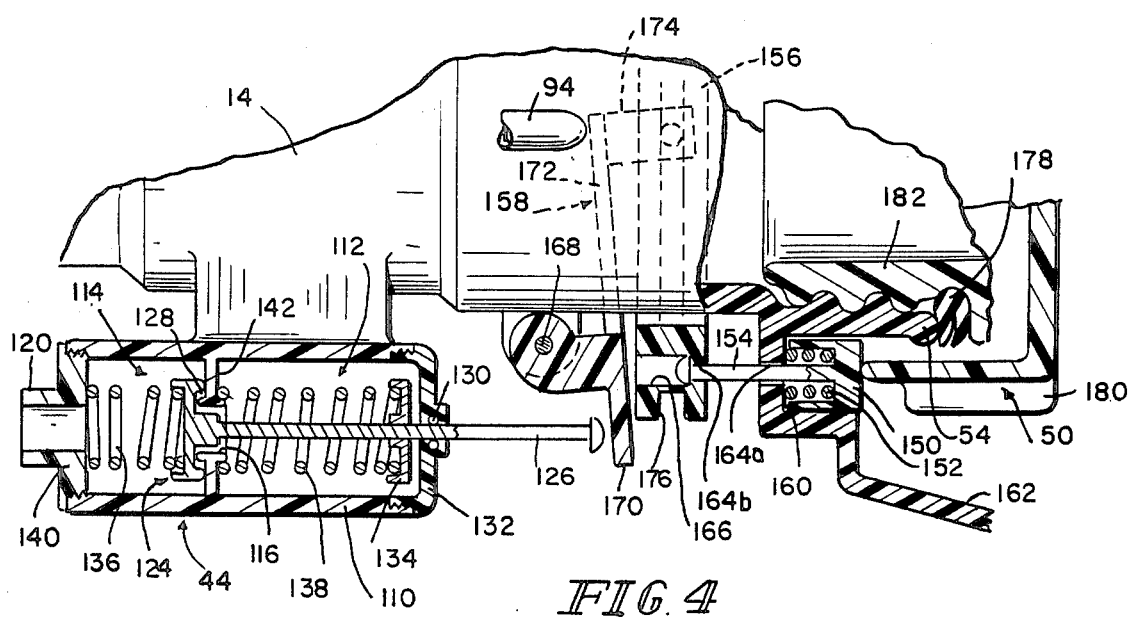
FIG. 3
FIG. 4

TWO-STAGE ROLL-OVER VALVE

This is a continuation-in-part of co-pending patent application Ser. No. 846,081 filed Mar. 31, 1986.

BACKGROUND AND SUMMARY OF THE INVENTION

This invention relates to vehicle emissions control, and particularly to a refueling vapor recovery system designed to capture, store, and subsequently purge the fuel vapors that are displaced and generated during a typical vehicle refueling operation. More particularly, this invention relates to a vent assembly that is mounted in an outlet formed in a fuel tank wall and includes a housing containing a roll-over valve and a vapor recovery valve.

Polluting emissions are released into the atmosphere during each and every motor vehicle refueling activity. Typically, removal of a fuel cap permits pressurized fuel vapors present within the vehicle fuel system to escape to the atmosphere. In view of the frequency of vehicle refueling activities, it will be appreciated that a significant quantity of otherwise combustible fuel is lost to the atmosphere each time a vehicle is refueled.

New fuel vapors are generated during refueling due to splash and agitation of the dispensed fuel, as well as from potential temperature differences between the fuel tank and the dispensed fuel. In addition, as the liquid fuel dispensed at the pump fills the vehicle fuel tank, fuel vapors that are present in the tank and generated during refueling are displaced by liquid fuel. These displaced fuel vapors are moved out of the fuel tank vapor space by the displacing action of the liquid fuel. In conventional vehicle fuel systems, these displaced vapors are released directly into the atmosphere via the fuel tank filler neck and are a contributing factor to air pollution.

One object of the present invention is to provide an emissions control system for advantageously capturing fuel vapors normally discharged during a vehicle refueling activity so as to reduce waste of fuel energy resources, assist in reducing the level of air pollution, and avoid the shortcomings of conventional vehicle fuel systems.

Another object of the present invention is to provide a fuel vapor recovery system that conforms to all government environmental and safety regulations regarding evaporative and refueling emissions, exhaust emissions, and vehicle impact, and that also satisfies customer-perceived vehicle functions such as drivability, ease of refueling, and control of fuel vapor odor.

Yet another object of the present invention is to provide a compact vapor recovery valve assembly having a roll-over valve incorporated therein that is conveniently mountable in a single outlet formed in a fuel tank wall separate from the filler neck so as to consolidate substantially all of the fuel vapor valving associated with the vapor recovery system in a central, accessible location on the fuel tank.

Another object of the present invention is to provide a venting module in an outlet formed in a fuel tank wall of a vehicle that is suitable for use in a fuel vapor recovery system and also constructed to reduce the likelihood of liquid fuel spillage from the fuel tank during vehicle rollover or the like. Desirably, one valve in the venting module is opened automatically during vehicle refueling by vacuum or other remote control means to permit pressurized fuel vapor in the fuel tank to be exhausted to a fuel vapor treatment site such as a charcoal canister. In addition, another valve in the venting module is desirably closed automatically during vehicle rollover or the like by gravity or other rollover sensing means to reduce likelihood of escape of liquid fuel from the fuel tank through the venting module itself.

Still another object of the present invention is to provide buoyant means for blocking the flow of liquid fuel through a vapor recovery valve assembly mounted in an outlet formed in a fuel tank wall when the fuel tank has been filled to near capacity so as to reduce the likelihood that liquid fuel will be discharged through the valve assembly due to high fuel levels or to splashing of the liquid fuel during filling of the fuel tank.

According to the present invention, a fuel vapor recovery system suitable for use in a vehicle includes means for dividing an outlet formed in a vehicle fuel tank into separate first and second fuel vapor flow ports. Each of the first and second ports exhaust pressurized fuel vapor from the fuel tank unless blocked by valve means. Vapor delivery means is provided for conducting fuel vapor from the first and second ports to a fuel vapor treatment site such as a charcoal canister or other vapor condenser positioned elsewhere in the vehicle. The fuel vapor recovery system advantageously processes fuel vapor discharged from the fuel tank through the outlet formed in the fuel tank wall to reduce environmentally hazardous emissions without discharging unprocessed fuel vapor to the atmosphere during refueling.

The fuel vapor recovery system further includes roll-over valve means and vapor recovery valve means. The roll-over valve means selectively blocks the flow of fuel vapors through the first fuel vapor port during vehicle rollover, thereby preventing liquid fuel from leaking out of the vehicle fuel tank into the vapor delivery means through the first port. The vapor recovery valve means selectively regulates the flow of fuel vapors through the second fuel vapor flow port. The vapor recovery valve means controls the discharge of pressurized fuel vapor from the fuel tank to the vapor delivery means through the second port.

Illustratively, the outlet formed in the fuel tank wall is situated away from the fuel tank filler neck. The likelihood that liquid fuel will escape from the fuel tank through either of the first and second ports is significantly reduced by forming this separate outlet in the top wall of the fuel tank. The roll-over and vapor recovery valve means act to control flow of fuel vapor and liquid fuel through the separate top fuel tank outlet. In addition, partition means is provided in the fuel tank filler neck for sealing a fuel dispensing nozzle to the filler neck during refueling. The partition means prevents loss of fuel vapor to the atmosphere through the filler neck during operation of the vapor recovery valve means in the separate fuel tank outlet.

In preferred embodiments, the fuel vapor recovery system includes a hollow venting module housing mounted in the outlet formed in the fuel tank wall. The interior region of the housing is divided by a partition into a first chamber inside the fuel tank for containing the roll-over valve means and a second chamber outside the fuel tank for containing the vapor recovery valve means. The hollow housing includes an inlet for admitting fuel vapor in the fuel tank into the first chamber and an outlet for exhausting fuel vapor in the second chamber to a point of use. The first and second chambers are interconnected by means of an aperture formed in the partition.

The roll over valve means incudes a nozzle for discharging fuel vapors from the first chamber into the second chamber and a valve piece for closing the nozzle. The distal end of the nozzle has a discharge opening. The valve piece is movable into the nozzle in response to tilting the roll-over valve means during a vehicle rollover or the like to block the flow of the fuel vapors through the first port during vehicle roll over conditions.

The discharge opening of the nozzle provides the first port in the fuel tank outlet. The nozzle extends into the partition aperture in spaced relation to the inwardly-facing rim of the partition aperture to define an annular space therebetween providing the second port in the fuel tank outlet. Thus, the second port is of annular shape and surrounds the generally circular first port.

The vapor recovery valve means includes a valve member in the second chamber and spring means for biasing the valve member against the partition to a position closing the second port. The valve member has a central aperture and is positioned in the second chamber to place the central aperture in alignment with the discharge opening of the nozzle when the second port is closed by the valve member so that fuel vapor can still be exhausted from the fuel tank via the first port. Of course, exhaust of fuel vapor through the first port will be blocked by the roll-over valve piece during vehicle rollover substantially to prevent the loss of liquid fuel in the fuel tank through the first port in the fuel tank outlet. In addition, the spring constant of the spring means is selected to ensure that the valve member will remain biased in its closing position substantially to prevent fuel loss through the second port during vehicle rollover.

The vapor recovery means further includes actuation means for selectively moving the valve member against the spring means to open the second port during vehicle refueling. This permits fuel vapor discharged from the fuel tank during each refueling activity to be conducted to the canister for liquid fuel recovery treatment therein prior to being discharged to the atmosphere. Illustratively, the actuation means is a vacuum system including a diaphram, a stem connecting the diaphram to the valve member, and means for applying a vacuum to the diaphram to move the valve member within the housing between a second port-closing and a second port-opening position. Preferably, the actuation means includes means for sensing the beginning of a vehicle refueling activity cycle.

A fuel cap is provided for closing and sealing the mouth of the fuel tank filler neck. In preferred embodiments, sufficient loosening of the fuel cap on the filler neck actuates the refueling control valve via the vacuum system to initiate a vapor recovery sequence without breaking the vapor seal provided by the fuel cap or otherwise permitting untreated fuel vapor to be discharged directly into the atmosphere. The sensing means includes a control pad movable relative to the filler neck between positions in close proximity to the mouth of the filler neck. Illustratively, the control pad is spring-biased against the fuel cap whenever the fuel cap is mounted on the filler neck.

Also in preferred embodiments, float means is provided for selectively closing the inlet in the first chamber in response to accumulation of liquid fuel in the fuel tank in excess of a predetermined amount. The float means floats in liquid fuel in the tank and rises to its inlet-closing position as the liquid fuel level in the tank increases. The risk of discharge of liquid fuel through either the first or the second port is significantly reduced by the float means since liquid fuel is generally unable to enter the first chamber via the inlet at high liquid fuel levels of the fuel tank .

Additional objects, features, and advantages of the invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which:

FIG. 3 is an exploded perspective view of a preferred embodiment of a vapor recovery module in accordance with the present invention with portions broken away;

FIG. 4 is a longitudinal sectional view taken along lines 4—4 of FIG. 3 showing a fuel cap mounted on a fuel tank filler neck in a fully-tightened position during normal non-refueling activities;

DETAILED DESCRIPTION OF THE DRAWINGS

Figure 1:
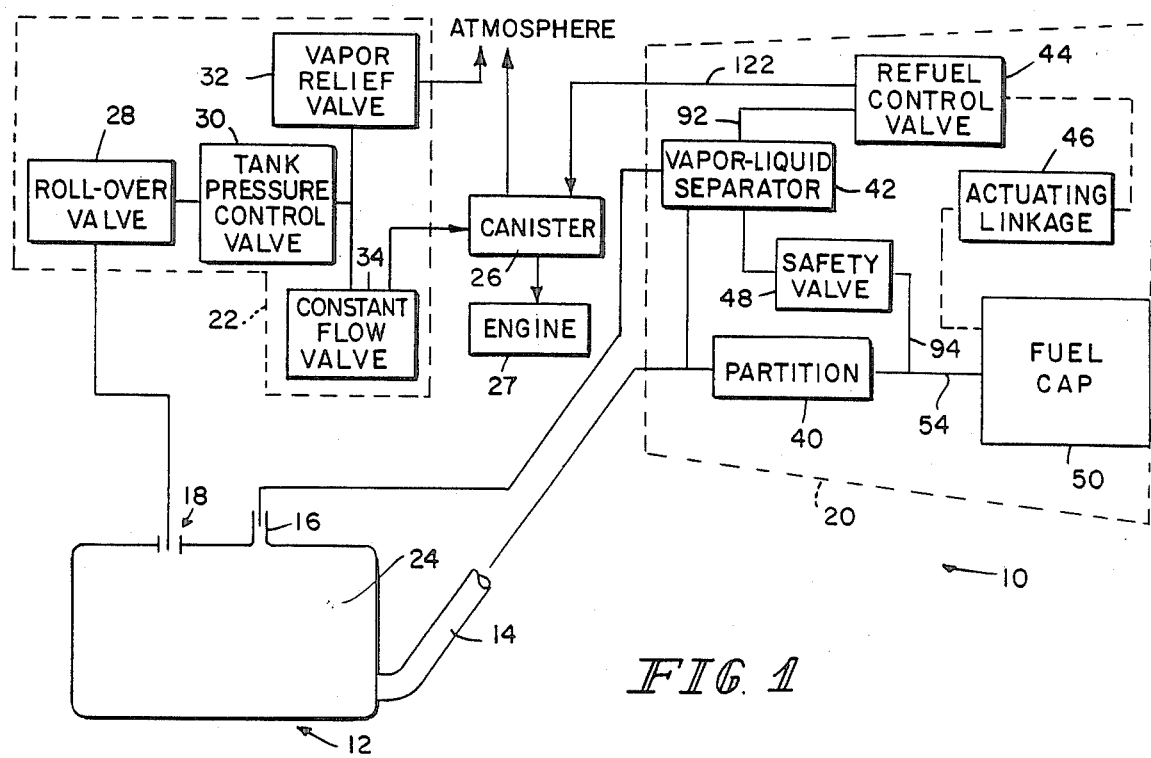
FIG. 1 is a block diagram of a system for recovering vapors during a vehicle refueling activity in accordance with the present invention.

Referring to FIG. 1, one preferred embodiment of a vapor recovery system 10 includes a fuel tank 12 having a filler neck 14; a fill-limiting vent tube 16, and a vent valve opening 18, a vapor recovery module 20, and a roll-over valve module 22. The vapor recovery module 20 is automatically actuated in the manner explained below to conduct substantially all fuel vapors that are present in the vapor space 24 of the fuel tank 12, displaced by liquid fuel during refueling, and generated during refueling, to a fuel vapor treatment site 26 for environmental treatment therein. Preferably, a conventional charcoal canister or other vapor condenser is provided at treatment site 26 to adsorb liquid fuel entrained in the recovered fuel vapors onto a substrate to permit recombustion in vehicle engine 27 at a later time.

In the embodiment of FIG. 1, the roll-over valve module 22 includes a roll-over valve 28, a tank-pressure control valve 30, a vapor-relief valve 32, and a constant flow valve 34. The roll-over valve module 22 is preferably mounted in a wall of the fuel tank 22 at vent valve opening 18. The roll-over valve module 22 serves a dual purpose by selectively releasing fuel vapors from the vapor space 24 to either the canister 26 or the atmosphere so as to regulate flow of fuel vapors to the canister 26, and by automatically closing the vent valve opening 18 during a vehicle rollover accident so as to guard against hazardous fuel leakage. Reference is hereby made to copending U.S. patent application Ser. No. 06/837,152 entitled: "Roll-over Valve" and filed on Mar. 7, 1986 for a complete disclosure of a roll-over valve assembly suitable for use in the vapor recovery system 10.

As shown in block diagram form in FIG. 1, the vapor recovery module 20 includes a partition 40 in the filler neck 14, a vapor-liquid separator 42, a refuel control valve 44, an actuating linkage 46, a safety valve 48, and a fuel cap 50. Illustratively, the actuating linkage 46 provides means for sensing whenever the fuel cap 50 is loosened a sufficient amount during an initial stage of each refueling activity. The actuating linkage 46 also provides means for actuating the refuel control valve 44 in response to the sensing means. Actuation of refuel control valve 44 permits fuel vapors present in the vapor space 24, and otherwise associated with refueling, to be conducted to the canister 26 via a vapor flow path in the vapor recovery module 20 instead of allowing such environmentally damaging vapor to escape untreated to the atmosphere through filler neck outlet 54. FIGS. 3-6 illustrate one preferred arrangement of the components illustrated in block diagram form in FIG. 1.

Figure 6:
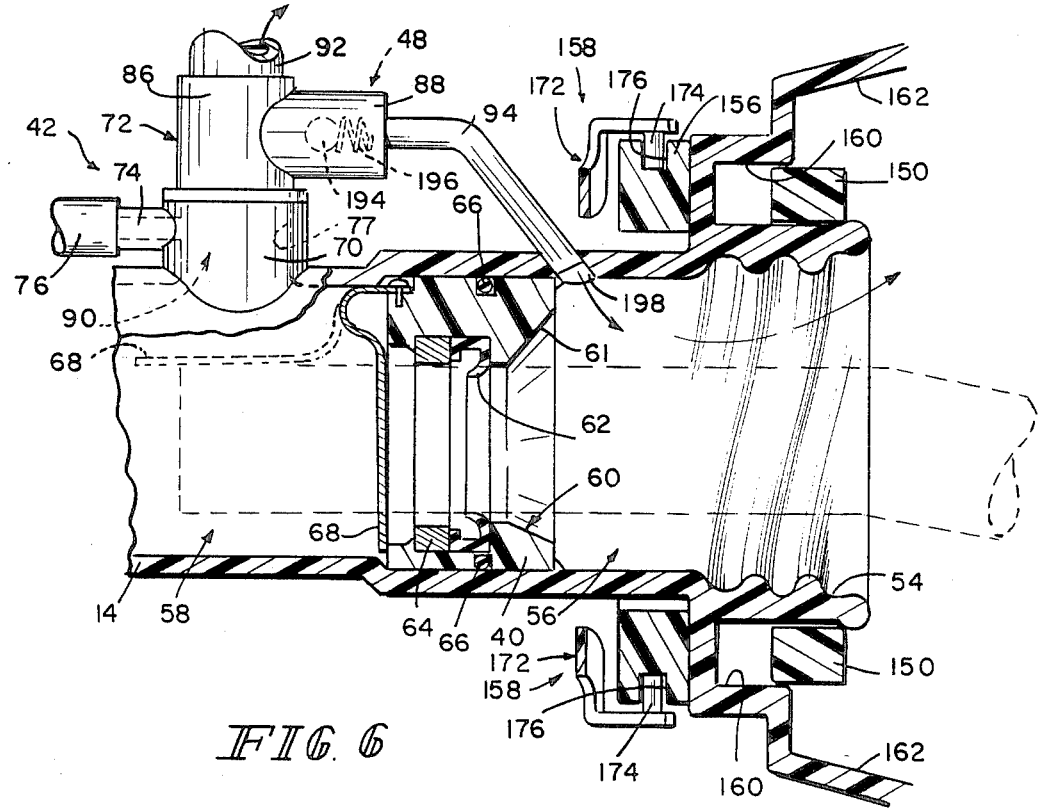
FIG. 6 is a longitudinal sectional view taken along lines 6—6 of FIG. 3 showing a fuel-dispensing nozzle in phantom lines inserted into the fuel tank filler neck during refueling.

Referring primarily to FIGS. 1 and 6, partition 40 is staked in place in the filler neck 14 in proximity to the filler neck mouth 54 to separate filler neck 14 into an outer chamber 56 and an inner chamber 58. The outer chamber 56 is communicable with the atmosphere via filler neck mouth 54 whenever the fuel cap 50 is removed. The inner chamber 58 is always in fluid communication with the fuel tank 12 via the filler neck 14. Advantageously, partition 40 provides a vapor tight inner chamber 58 so as to prevent escape of untreated fuel vapors to the atmosphere during refueling.

At service, partition 40 may be easily detached for repair or disposal. As shown in FIG. 6, the inner diameter of outer chamber 56 is stepped to permit removal of the partition 40 therethrough. One advantage of the present invention is that partition 40 is replaceable as a unit for service through the outer chamber 56 and filler neck mouth 54 without disassembly of the vapor recovery module 20 from its installed position in a vehicle. After service, a repaired or replacement partition may be staked into a proper position within filler neck 14.

Partition 40 includes a nozzle size-restricting passageway 60 for admitting a pump nozzle (represented by broken lines in FIG. 6) into the inner chamber 58. An annular nozzle seal 62 sealingly embraces the pump nozzle during pumping as shown in FIG. 6. Annular nozzle seal 62 is held in sealing position in the passageway 60 by retainer 64 so that fuel can be dispensed into the inner chamber 58 without coupling the inner and outer chambers 58, 56 in fluid communication during refueling. Hard nozzle pilot surface 61 is provided in passageway 60 to protect seal 62 from damage during refueling. An O-ring seal 66 is situated in a recess formed in an exterior wall of partition 40 to engage an interior wall of passageway 60 in sealing relation. Leaded fuel splash door 68 is pivotally mounted or otherwise deflectable in relation to an inner end of partition 40 in a customary way to splash leaded fuel dispensed using an ordinary pump nozzle back toward a user.

Vapor-liquid separator 42 is used for separating liquid fuel entrained in fuel vapor discharged from fuel tank 12 via a fill-limiting tube 16 and/or a filler neck 14 to reduce the mass of fuel entrained in such discharged vapor prior to introducing the vapor into canister 26. As shown best in FIG. 3, the separator 42 includes a hollow base 70 fixed to an exterior surface of filler neck 14 and a top cover assembly 72.

Referring to FIGS. 3 and 6, base 70 includes an inlet 74 in fluid communication with the fill-limiting vent tube 16 via pipe 76, a liquid fuel outlet 77, and an upper opening 78 coverable by top cover assembly 72. Annular shield 80 is installed in the chamber provided by hollow base 70 in spaced relation to define an annular swirl passage 82 therebetween. The top cover assembly 72 includes a discriminator screen 84, a fuel vapor outlet 86, and a pressure-relief outlet 88. The discriminator screen 84 depends therefrom so that it is suspended in an interior space 90 of annular shield 80 when the top cover assembly 72 is mounted on the hollow base 70.

In use, fuel vapor introduced into separator 42 is swirled through swirl passage 82 causing liquid fuel (represented by broken line arrows in FIGS. 3 and 6) entrained in the fuel vapor to move downwardly toward the liquid fuel outlet 77 while the remaining lower density fuel vapor (represented by solid line arrows in FIGS. 3, 5, and 6) moves upwardly toward the fuel vapor outlet 86. The discriminator screen 84 intercepts the swirling fuel vapor so that some of the liquid fuel entrained in the vapor coalesces or otherwise agglomerates thereon to form liquid fuel droplets that once formed fall under gravity toward liquid fuel outlet 77. Fuel vapor outlet 86 is coupled to refuel control valve 44 by pipe 92 and pressure-relief outlet 88 is coupled directly to safety valve 48. In addition, liquid fuel outlet 77 is coupled to inner chamber 58 of the filler neck 14 to provide means for recovering separated liquid fuel by recirculation of same to the fuel tank 12 via filler neck 14.

Figure 5:
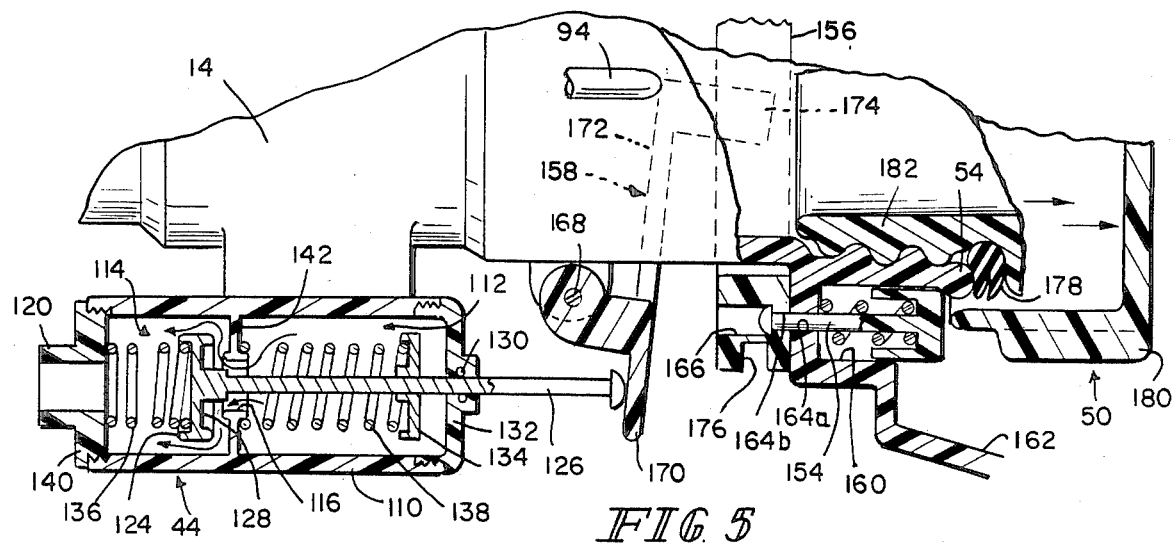
FIG. 5 is a view similar to the view in FIG. 4 showing the fuel cap in a slightly loosened position during an initial stage of fuel vapor recovery.

Refuel control valve 44 regulates the flow of fuel vapor discharged from separator 42 to the canister 26 so that such flow is permitted only during vehicle refueling activity. Referring to FIGS. 4 and 5, the refuel control valve 44 includes a valve housing 110 providing downstream chamber 112 coupled in fluid communication to an upstream chamber 114 by central aperture 116. As shown best in FIG. 3, the refuel control valve 44 also includes a fuel vapor inlet 118 coupled to the fuel vapor outlet 86 of separator 42 via pipe 92 and fuel vapor outlet 120 coupled to canister 24 via pipe 122.

A primary valve head 124 is provided in upstream chamber 114 for closing central aperture 116 during all period of non-refueling activity to prevent unwanted distribution of fuel vapor from separator 42 to the canister 26. Valve stem 126 extends in substantially spaced-apart parallel relation to filler neck 14 from a downstream face 128 of valve head 124 through a bearing support 130 provided in end wall 132 of valve housing 110 toward the filler neck mouth 54. A secondary valve head 134 is provided in downstream chamber 112 and rigidly attached to valve stem 126 for movement therewith.

The primary valve head 124 is normally loaded to its shut-off position closing aperture 116 by each of biasing springs 136, 138 as shown best in FIG. 4. Primary biasing spring 136 acts between fixed end wall 140 and movable primary valve head 124 while secondary biasing spring 138 acts between fixed central wall 142 and movable secondary valve head 134. It will be appreciated that such a dual-spring arrangement advantageously ensures substantially fail-safe operation of refueling control valve 44 in that the primary valve head 124 will remain in its normally closed shut-off position even if one of springs 136, 138 should fail.

Actuating linkage 46 provides one preferred means for actuating the refueling control valve 44 during a predetermined initial stage of each refueling activity. In the illustrated embodiment, a mechanical spring-biased linkage is provided for sensing when fuel cap 50 is loosened from its mounted position on the filler neck 14, which loosening is indicative of the beginning of a refueling activity cycle, and for then moving the primary valve head 124 in opposition to biasing springs 136, 138 to an aperture (116)-opening position. Once aperture 116 is opened, fuel vapors can flow therethrough from the vapor-liquid separator 42 to the canister 26 during refueling. It will be appreciated that various hydraulic, pneumatic, electrical, and mechanical sensory switching systems could form analogs of the preferred mechanical actuating linkage 46 illustrated in FIGS. 3-6 without departing from the present invention.

One important feature of the present invention is that the vapor recovery module 20 is activated automatically or at least remotely controlled to recover fuel vapor for later recombustion whenever the vehicle is ready for refueling. It is within the scope of the present invention to actuate said linkage means by a manner other than loosening of a fuel cap. For example, actuating linkage 46 could be coupled to a fuel door, fuel pump nozzle, control button, or other similar member to permit a refueling attendant to actuate the refueling control valve 44 in a variety of different ways at a preferred moment during each refueling activity cycle.

Referring to FIGS. 3-6, actuating linkage 46 includes an annular control pad 150, pad-biasing springs 152, control rods 154, control ring 156, and pivoting yoke lever 158. As shown best in FIGS. 4-6, control pad 150 is positioned in outwardly-facing annular groove 160 formed in refueling cavity wall 162 in a region surrounding the mouth 54 of the filler neck 14. A plurality of control rods 154 extend from control pad 150 through companion rod-receiving apertures 164a,b formed in the refueling cavity wall 162 and control ring 156, respectively, into engagement with annular groove 166 formed in control ring 156 as seen in FIGS. 4 and 5. A pad-biasing spring 152 surrounds each control rod 154 to bias the control pad 150 normally from the inactive position shown in FIG. 4 to the valve-actuating position shown in FIG. 5. Although spring 152 is shown in annular groove 160 in FIGS. 4 and 5, it is expected that such a spring could alternatively be positioned elsewhere, e.g., in contact with control ring 156. Yoke lever 158 is mounted for pivotal movement about a vertical pivot axis at pivot 168. In the illustrated embodiment best seen in FIGS. 1, 4, and 5, yoke lever 158 includes a central lever arm 170 for contacting a distal end of valve stem 126 and a pair of oppositely-extending outstretched lever arms 172 for engaging the control ring 156. In particular, as best seen in FIG. 6, projections 174 on lever arms 172 engage a radially-outwardly facing channel 176 formed on an outer edge of control ring 156 to interconnect lever arms 172 and control ring 156.

The safety valve 48 is illustrated in FIGS. 1, 3, and 5 and includes a normally closed poppet valve 194 and biasing means 196 for yieldably biasing the poppet valve 194 from an open venting position (not shown) to its normally closed position. The poppet valve 194 is moved against the yieldable biasing means 196 whenever the pressure in a vapor flow passage 16, 70, 76, 92, 110, and 122 coupling the fuel tank 12, vapor-liquid separator 42, refuel control valve 44, and vapor treatment site 26 in fluid communication exceeds a predetermined threshold pressure level. In addition, the safety valve 48 is configured to issue a sonic warning to a refueling attendant during exhaustion to the atmosphere via pipe 94, outlet opening 198, and outer chamber 56 of the fuel vapor discharged from the vapor-liquid separator 42 via the open poppet valve 194. Thus, the safety valve 48 is designed to provide a bypass conduit around the sealed partition 40 to provide a means for discharging fuel vapor to the atmosphere during refueling in the event the refuel control valve 44, actuating linkage 46, or other component is disabled due to malfunction.

In operation, loosening of fuel cap 50 allows control pad 150 to be urged by spring 152, to the right of its position shown in FIG. 4 toward its valve-actuating position shown in FIG. 5. At the same time, control rods 154 pull control ring 156 also to the right causing yoke lever 158 to pivot in a clockwise direction about its pivot axis 168, pushing the distal end of valve stem 126 to the left of its position shown in FIG. 4, thereby causing valve heads 124, 134 to compress springs 136, 138, respectively. Such movement opens valve head 124 permitting fuel vapor to be conducted therethrough to the canister 26 in response to loosening of the fuel cap 50. It is envisioned that fuel cap 50 threadedly engages the filler neck 14 at its mouth 54 so that fuel cap 50 may be loosened simply by rotation. Seal 178 is provided between filler neck cap 14 and fuel cap 50 to seal outer chamber 56 at its outermost end 54 as shown best in FIGS. 4 and 5.

Fuel cap 50 provides suitable means for actuating control pad 150 to vent vapor through the refueling control valve assembly 44 without prematurely breaking the seal provided by seal 178. This seal-maintaining function could be accomplished in a number of different ways. Preferably, fuel cap 50 includes a lost-motion feature so that a control pad-activating grip portion 180 of fuel cap 50 is movable relative to an inner seal-maintaining portion 182 also of the cap 50 during the initial stages of every refueling activity. Thus, the refueling attendant can rotate grip portion 180 a sufficient amount, desirably about one-half of a full turn, to release the outwardly biased control pad 150 without rotating seal-maintaining portion 182, which release could result in prematurely breaking the seal provided by seal 178.

Figure 2:
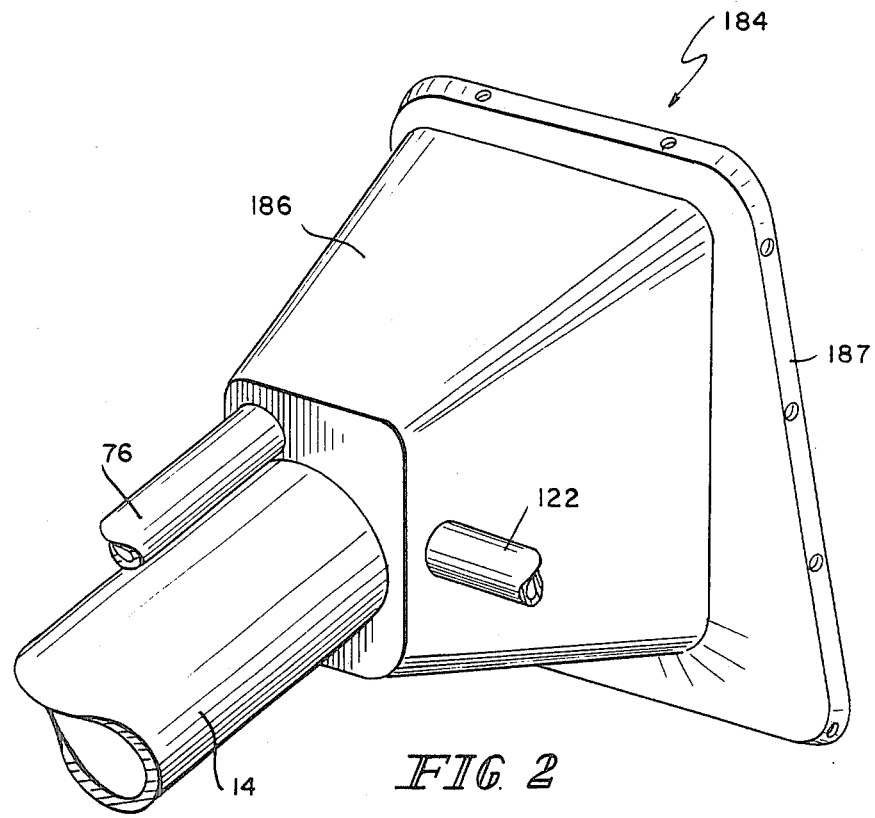
FIG. 2 is a perspective view of an impact shield for use in protecting a portion of the system of the present invention.

Referring to FIGS. 2 and 3, refueling module impact shield 184 is provided for mounting to interior plate 183 within the vehicle interior to protect exposed portions of vapor recovery module 20. The impact shield 184 includes a shield housing 186 provided with peripheral mounting flange 187. The impact shield 184 is formed to include apertures provided with fill, fill-limit, and canister connections and is constructed of a high impact nylon material or the like to protect sensitive components of vapor recovery module 20.

In another embodiment (not shown) of the system shown in FIG. 1, it is contemplated that roll-over valve module 22 be incorporated directly into the structure of the vapor recovery module 20. In one arrangement, this could be accomplished by coupling (not shown) in fluid communication the fuel vapor inlet port of roll-over valve 28 to fuel vapor outlet 86 of vapor-liquid separator 42 instead of being coupled in fluid communication to fuel tank vapor space 24 via vent valve opening 18. It will be appreciated that various components of the roll-over valve module 22 could be included, either individually or in combination, in various locations within the network of the vapor recovery module 20 without departing from the scope of the present invention.

Figure 7:
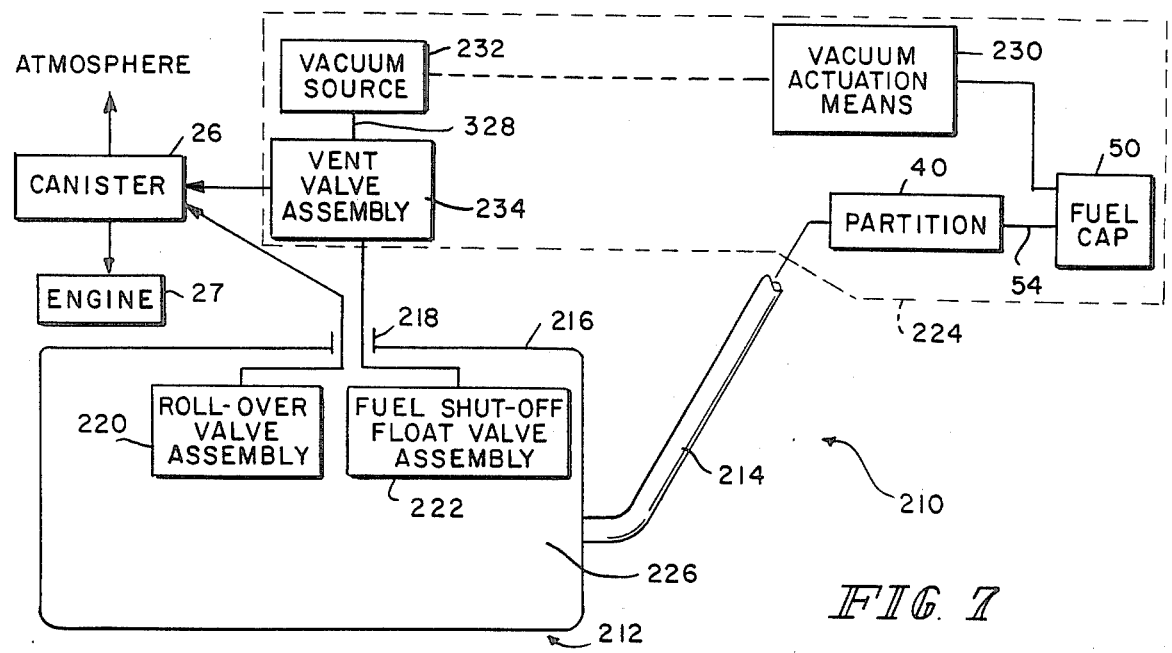
FIG. 7 is a block diagram of a system for recovering vapors during a vehicle refueling activity in accordance with another embodiment of the present invention.

In yet another embodiment of the invention illustrated in FIGS. 7–11, those elements referenced by numbers identical to those in FIGS. 1–6 perform the same or similar function. Referring to FIG. 7, a vapor recovery system 210 includes a fuel tank 212 having a filler neck 214 and a top wall 216 formed to include an outlet 218, a roll-over valve assembly 220, a fuel shut-off float valve assembly 222, and a vapor recovery module 224. The vapor recovery module 224 is automatically actuated in a manner similar to actuation of module 20 of the embodiment of FIGS. 1–6. Once actuated, pressurized fuel vapors that are present in the vapor space 226 of the fuel tank 212 are conducted to fuel vapor treatment site 26.

As shown in block diagram form in FIG. 7, the vapor recovery module 224 includes partition 40 in the filler neck 214, fuel cap 50, vacuum actuation means 230, vacuum source 232, and vent valve assembly 234. Illustratively, vacuum actuation means 230 provides means for sensing whenever the fuel cap 50 is loosened a sufficient amount during an initial stage of each refueling activity. FIGS. 8–11 illustrate one preferred arrangement of several of the components illustrated in block diagram form in FIG. 7.

Figure 8:
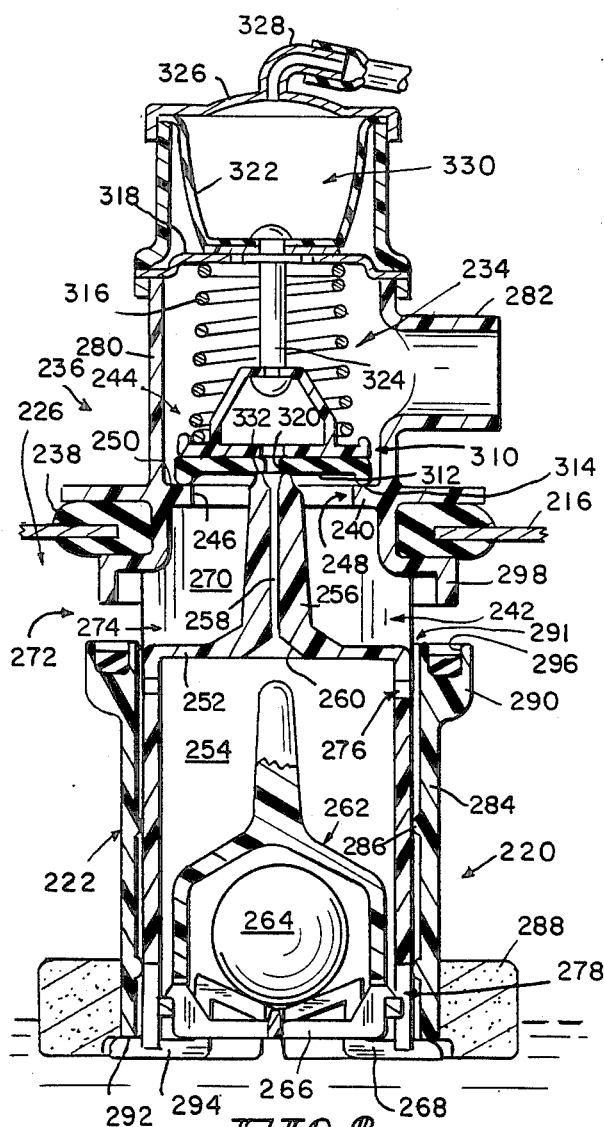
FIG. 8 is a sectional detail view of the embodiment of FIG. 7 showing a venting module in normal running condition and valves arranged to open the first port and close the second port.

A hollow vent housing 236 provides the framework for the novel venting module 220, 222, 234 of the present invention. Housing 236 is mounted in the outlet 218 formed in the top wall 216 of fuel tank 212 as shown in FIG. 8. Gasket 238 seals the joint between top wall 216 and the portion of housing 236 bordering outlet 218 to prevent the escape of fuel vapor therethrough. A housing partition 240 extends into the interior of housing 236 to divide the housing 236 into first and second interior chambers 242 and 244. Housing 236 is mounted in outlet 218 to position the first chamber 242 substantially within the vapor space 226 of the fuel tank 212 and to position the second chamber 244 on the other side of top wall 216 outside of tank 212. Partition 240 includes an annular radially inwardly-facing surface 246 defining an aperture 248 and an axially outwardly facing surface 250 providing a valve seat in the second chamber 244. Aperture 248 interconnects the first and second chambers 242, 244 in fluid communication.

The roll over valve assembly 220 is positioned substantially within the first chamber 242 and includes a wall 252 extending across the diameter of housing 236 to form valve chamber 254. A nozzle 256 on wall 252 includes an outlet passageway 258 interconnecting valve chamber 254 and the second chamber 244 in fluid communication. The outlet passageway 258 has a discharge opening 332. The wall 252 is also formed to include an axially downwardly-facing, generally conical valve seat 260 in concentric registry with passageway 258. The assembly 220 further includes a valve piece 262, ball 264, criss-cross ball retainer 266, and a base 268. Reference is hereby made to co-pending U.S. application Ser. No. 06/837,152, entitled "Roll-Over Valve" and filed Mar. 7, 1986, for a complete description of the structure and operation of a roll-over valve suitable for use in the present invention.

Housing 236 further includes a lower side wall 270 situated in the vapor space 226 and formed to include inlets 272 for admitting fuel vapor from the vapor space 226 into a space 274 between wall 252 and partition 240. The lower side wall 270 is also formed to include upper and lower inlets 276, 278 for admitting fuel vapor from the vapor space 226 into the valve chamber 254. Housing 236 further includes an upper side wall 280 situated outside of the fuel tank 212 and formed to include an outlet 282 for exhausting fuel vapor from the second chamber 244 to canister 26.

The fuel shut-off float valve assembly 222 surrounds the periphery of lower side wall 270 and includes a shell 284 having a plurality of radially inwardly-extending baffles 286, a buoyant ring 288, and engaging means 290. The baffles 286 act to align the shell 284 and housing 236 in spaced relation. In addition, the baffles 286 are annular to obstruct the flow of liquid fuel through the small annular space between the portion of side wall 270 below discharge nozzle 256 and the inner wall of shell 284. Buoyant ring 288 is mounted at the lower end of shell 284, causing shell 284 to float in liquid fuel in tank 212 whenever fuel rises above a predetermined level. Lower edge 292 of shell 284 engages flange 294 of base 268 to support shell 284 in a lowest position whenever fuel in the tank 212 falls below the predetermined level. The engaging means 290 includes an upwardly opening recess for receiving a downwardly-extending lip 298 on lower side wall 270.

Figure 11:
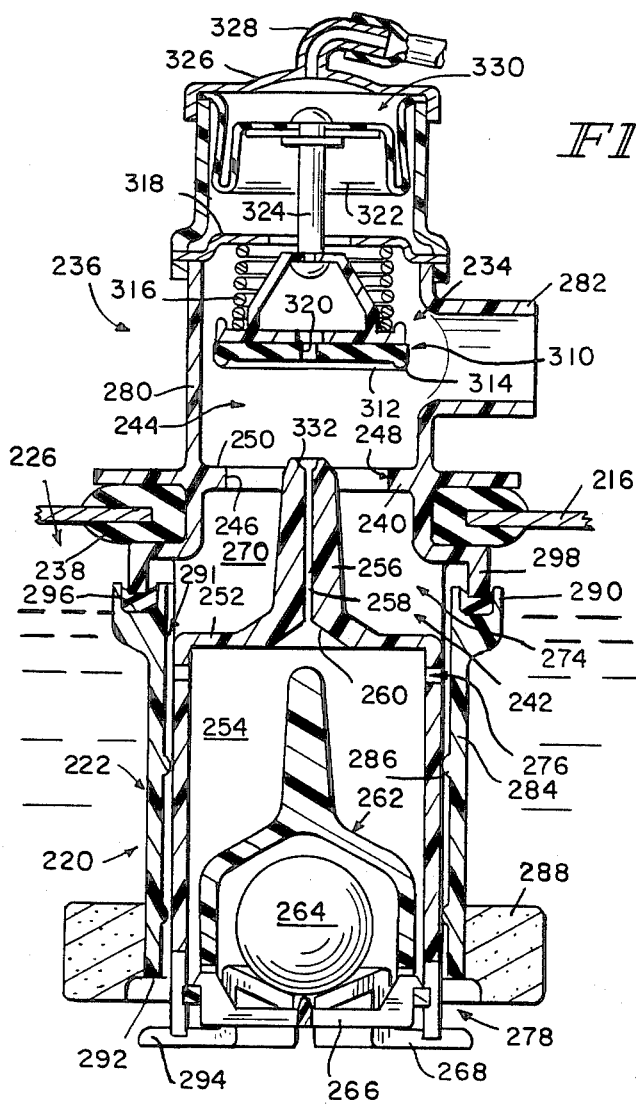
FIG. 11 is a view similar to FIG. 10 at high fuel level showing a fuel shut-off float valve surrounding the roll-over valve assembly in its shut-off position during refueling.
Figure 10:
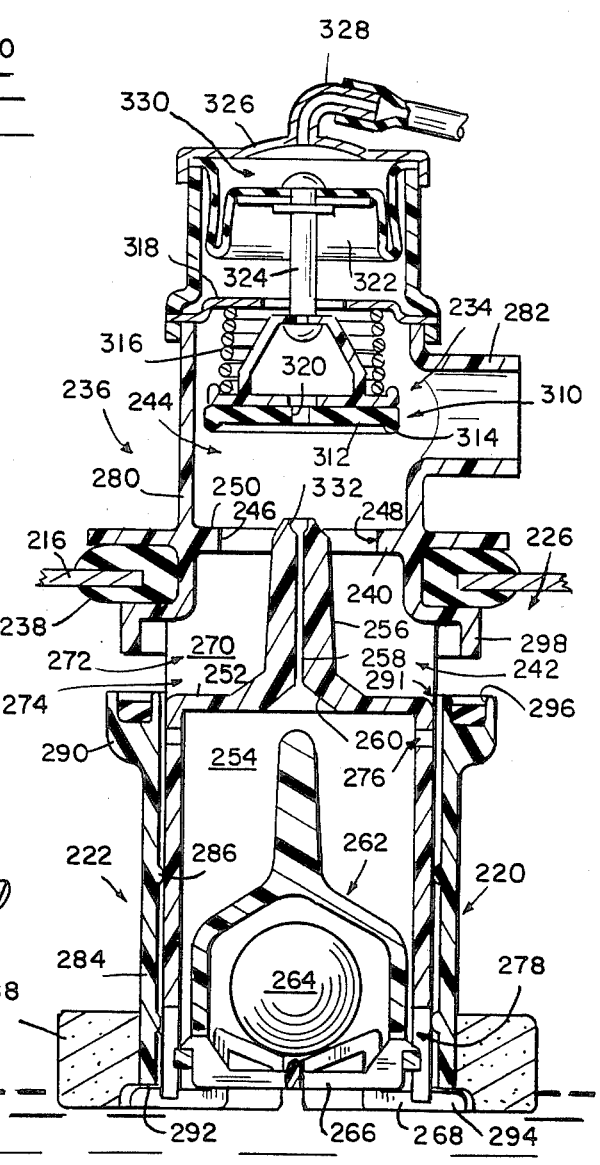
FIG. 10 is a view of the embodiment illustrated in FIG. 8 at low fuel level showing the venting module in a normal upright position during refueling and a valving arrangement for opening both of the first and second ports.

As the level of liquid fuel in tank 212 rises above the predetermined level, the floating shell will likewise rise from the position illustrated in FIG. 10 to the position illustrated in FIG. 11. Such upward movement of shell 284 causes recess 296 to engage and mate with lip 298, thereby blocking the flow of liquid fuel into space 274 via inlet 272. Fuel vapor can still exit from the tank 212 along this path since no vapor seal exists between recess 296 and lip 298. However, liquid fuel is generally unable to enter space 274 via inlet 272 due to the "liquid barrier" established by floating shell 284. Thus, spillage of liquid fuel from tank 212 via outlet 218 is advantageously reduced.

Figure 9:
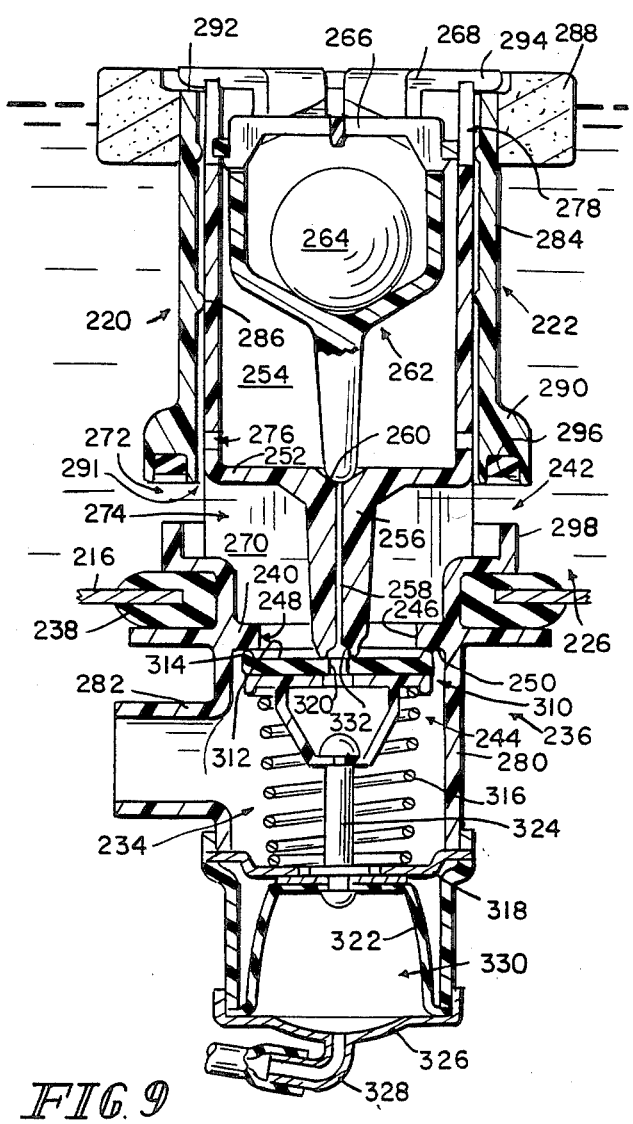
FIG. 9 is a view of the embodiments illustrated in FIG. 8 showing the venting module in an inverted position during one vehicle rollover condition and a valving arrangement for closing both of the first and second ports.

The vent valve assembly 234 is positioned in the second chamber 244 and includes a valve member 310 having an axially inner surface 312 and a bead 314 for sealingly engaging valve seat 250 on partition 240. Assembly 234 also includes spring means 316 acting between the valve member 310 and a top wall 318 of the housing 236. Normally, spring means 316 yieldably biases the valve member 310 against seat 250 as shown in FIGS. 8 and 9. The axially inner surface 312 is formed to include a central aperture 320 that is aligned in substantially concentric registry with the outlet opening 332 of passageway 258 when valve member 310 is in its biased position. Thus, fuel vapor discharged from nozzle 256 can be introduced into the second chamber 244 even when the valve member 310 is in its biased position.

In the illustrated embodiment, a vacuum system is provided for actuating valve member 310 at the beginning of each vehicle refueling cycle. This permits fuel vapors present in the vapor space 226, and otherwise associated with refueling, to be conducted to canister 26 instead of allowing the vapors to escape untreated to the atmosphere. Although a vacuum system is shown, it is within the scope of the present invention to employ electrical, mechanical, hydraulic, pneumatic, or other means to move the valve member 310 from its normal biased position illustrated in FIGS. 8 and 9 to its retracted refueling position illustrated in FIGS. 10 and 11. For example, an electro mechanical solenoid (not shown) could provide a suitable alternative to vacuum source 232.

The vent valve assembly 234 further includes a resilient diaphragm 322, a stem 324 connecting the diaphram 322 to the valve member 310, and a closure 326 having a vacuum conduit 328. The closure 326 and diaphragm 322 cooperate to form a vacuum chamber 330.

When actuated, a vacuum source 232 applies a vacuum to chamber 330 via conduit 328 to raise diaphragm 322 in an upward direction, thereby unseating valve member 310. Vacuum source 232 is active during vehicle shut-off so that a vacuum can be applied to chamber 330 to actuate valve member 310 as soon as the fuel cap 50 is loosened or another suitable actuation instruction given even though the engine 27 may not be idling. Such vacuum sources are known in the art. For example, a conventional vacuum source of the type designed to operate a vehicle brake system would be satisfactory.

The vacuum actuation means 230 includes a valve which connects vacuum source 232 to conduit 328 when activated by fuel cap removal or similar means. This valve may be a mechanical valve operated by lever or button or controlled by a pneumatic signal which is in turn controlled by the fuel cap position.

From the foregoing description, it will be appreciated that fuel vapor in the first chamber 242 inside tank 212 can be admitted into the second chamber 244 outside tank 212 along two independent paths. In the first case, the outlet opening 332 of discharge nozzle 256 provides a first fuel vapor flow port for exhausting pressurized fuel vapor in the valve chamber 254 into second chamber 244 along a radially inner first path through aperture 248. The first path is defined by passageway 258 in nozzle 256 and aperture 320 in valve member 310. In the second case, the distal end of nozzle 256 and the radially inwardly-facing surface 246 of partition 240 cooperate to define a second fuel vapor flow port therebetween for exhausting pressurized fuel vapor in space 272 into the second chamber 244 along a separate, radially outer second path. The second flow port is annular and substantially surrounds the first flow port. It will be understood that valve piece 262 provides means for blocking the flow of pressurized fuel vapor through the first port, while valve member 310 provides mutually exclusive means for blocking the flow of pressurized fuel vapor through the second port.

Various modes of operation of the venting module 220, 222, 234 are illustrated in FIGS. 8–11. A normal vehicle operation condition is illustrated in FIG. 8. A vehicle rollover condition is illustrated in FIG. 9. In addition, two vehicle refueling conditions are illustrated in FIGS. 10 and 11.

As shown in FIG. 8, as long as the vehicle is not being refueled, valve member 310 is biased against seat 250 to block the flow of fuel vapor and liquid fuel through the second port formed between the distal end of nozzle 256 and adjacent rim 246. As long as the vehicle remains substantially upright, pressurized fuel vapor in valve chamber 254 is exhausted into second chamber 244 via the first port provided by discharge opening 332 so that it can be conducted to canister 26 for treatment therein. The float valve assembly 222 is supported on flange 294 due to a low fuel level in tank 212. It will be appreciated that pressurized fuel vapor can still be discharged into the second chamber 244 via inlet 276 or 278, chamber 254, passageway 258, and the first port 332 even if inlet 272 is blocked to liquid flow. Such discharge is possible since engagement of engaging means 290 and lip 298 does not form a complete vapor seal.

A vehicle rollover condition is illustrated in FIG. 9. During a partial or complete vehicle rollover, ball 264 moves valve piece 262 into sealing engagement with valve seat 260 to block the flow of fuel through discharge nozzle 256 as explained more fully in the above referenced copending application Ser. No. 06/837,152 filed Mar. 7, 1986. In an extreme vehicle rollover case, the valve housing 236 could be completely inverted in the illustrated manner. This would cause liquid fuel in the vapor space 226 to enter space 274 in housing 236 through inlet 272 and bear upon surface 312 of valve member 310. Nevertheless, valve member 310 continues to block the flow of fuel through the second port since spring means 316 is configured to exert a force against valve member 310 that is greater than the opposing force generated by liquid fuel in space 274. In particular, the spring constant of spring means 316 is selected to retain the valve member 310 in its seated position during a complete inversion of valve housing 236. It will be appreciated that the flow of fuel through the first and second ports, and thus through outlet 218, is blocked by valves 262 and 310 even in the worst of vehicle rollover circumstances.

The operation of venting module 220, 222, 234 during vehicle refueling is illustrated in FIGS. 10 and 11. Valve member 310 is moved to its second port-opening position to exhaust pressurized fuel vapor in first chamber 242 into second chamber 244 by pulling a vacuum in vacuum chamber 330. In the illustrated embodiment, vacuum source 232 is actuated by a signal from vacuum actuation means 230 in response to loosening of fuel cap 50 by a vehicle refueling attendant during the first stages of each refueling activity. It will be appreciated that the vacuum source 232 could be actuated in response to a variety of other instructions received from electrical, mechanical, hydraulic, or pneumatic command systems which employ automatic or manual means for sensing the onset of vehicle refueling activities.

Float valve 222 is shown in its disabled position in FIG. 10. In particular, shell 284 remains in its lower position supported on flange 294 as long as the level of liquid fuel in tank 212 does not exceed a predetermined level. Float valve 222 is moved to its enabled position shown in FIG. 11 as soon as the liquid fuel level in tank 212 rises above the predetermined level. Shell 284 is moved to its flow-blocking upper position engaging the depending lip 298 as the fuel tank is filled causing buoyant ring 288 to float upwardly toward the top wall 216 of tank 212. The likelihood of fuel spillage is reduced by float valve 222 since liquid fuel is substantially prevented from entering space 274 as a result of high fuel level and/or fuel splashing in tank 212 that occurs during refueling or vehicle operation.

Although the invention has been described in detail with reference to certain preferred embodiments, variations and modifications exist within the scope and spirit of the invention as described and as defined in the following claims.

What is claimed is:

1. A system for recovering fuel vapors discharged from a vehicle fuel system during refueling, the vehicle fuel system including a fuel tank having a filler neck and a separate outlet, the system comprising
   means for dividing the outlet into separate first and second fuel vapor flow ports so that pressurized fuel vapor in the fuel tank is exhaustable therefrom through at least one of the first and second ports,
   vapor delivery means for conducting fuel vapor from the first and second ports to a fuel vapor treatment site,
   roll-over valve means for selectively blocking the flow of fuel vapors through the first fuel vapor flow port during vehicle rollover or the like, and
   vapor recovery means for selectively regulating the flow of fuel vapors through the second fuel vapor flow port so that fuel vapor in the fuel tank can be discharged through the fuel tank outlet and recovered at the fuel vapor treatment site during vehicle refueling.

2. The system of claim 1, wherein the dividing means includes a continuous annular wall positioned in the outlet in spaced relation to a rim of the outlet, the annular wall having an interior region defining the first fuel vapor flow port and an exterior surface cooperating with the rim of the outlet to define the second fuel vapor flow port therebetween.

3. The system of claim 1, wherein the vapor recovery means further includes a vapor-condensing canister at the fuel vapor treatment site.

4. The system of claim 1, wherein the vapor delivery means includes a vapor flow passage, and the vapor recovery means includes a valve member movable within the vapor flow passage between a first position blocking flow of fuel vapor through the second fuel vapor flow port and a second position permitting flow of fuel vapor through the second fuel vapor flow port.

5. The system of claim 4, wherein the vapor recovery means further includes actuation means for moving the valve member to its second position during refueling activity.

6. The system of claim 5, in combination with a filler neck cap, wherein the actuation means acts to move the valve member to its second position in response to movement of the filler cap relative to the filler neck past a predetermined threshhold point during removal of the filler cap.

7. The system of claim 1, wherein
   the vapor delivery means includes a vent housing having a radially inwardly extending surface formed to include a vent inlet opening communicating with the fuel tank outlet and a vent outlet opening communicating with the fuel vapor treatment site,
   the radially inwardly extending surface provides a seat surrounding the vent inlet opening, and
   the dividing means includes nozzle means for conducting fuel vapor from the fuel tank into the vent housing, the nozzle means being configured to define the first fuel vapor flow port and extending through the vent inlet opening into the vent housing to define the second fuel vapor flow port therebetween.

8. The system of claim 7, wherein the vapor recovery means includes
   a valve member having an axially inner surface exposed to the pressure in the fuel tank and formed to include an aperture extending therethrough, the aperture having an opening in the axially inner surface,
   spring means for yieldably biasing the valve member against the seat provided by the radially inwardly extending surface normally to close the second fuel vapor flow port in the vent inlet opening and to position the aperture of the valve member in alignment with the nozzle means so that fuel vapor can be conducted through the outlet via the first fuel vapor flow port while the second fuel vapor flow port is closed by the valve member, and
   actuation means for selectively moving the valve member against the spring means to open the second fuel vapor flow port during vehicle refueling.

9. The system of claim 8, wherein the actuation means includes a diaphragm, stem means for connecting the diaphragm to the valve member, and vacuum means for applying a vacuum to the diaphragm to move the valve member within the housing between a second fuel vapor port-closing position and a second fuel vapor port-opening position.

10. The system of claim 8, wherein the actuation means includes sensing means for providing an actuation instruction indicative of the beginning of a vehicle refueling activity cycle, and the actuation means is responsive to the actuation instruction provided by the sensing means.

11. A system for recovering fuel vapors discharged from a vehicle fuel system during refueling, the vehicle fuel system including a fuel tank having a filler neck and a separate outlet, the system comprising
   means for dividing the outlet into separate first and second fuel vapor flow ports,
   vapor delivery means for connecting fuel vapor from the first and second ports to a fuel vapor treatment site,
   roll-over valve means for selectively blocking the flow of fuel vapors through the first fuel vapor flow port during vehicle rollover or the like, and
   vapor recovery means for selectively regulating the flow of fuel vapors through the second fuel vapor flow port so that fuel vapor in the fuel tank can be discharged through the fuel tank outlet and recovered at the fuel vapor treatment site during vehicle refueling, the vapor recovery means including valve means for selectively blocking the flow of fuel vapor through the second fuel vapor flow port without blocking the flow of fuel vapor through the first fuel vapor flow port so that pressurized fuel vapor in the fuel tank is exhaustable therefrom through the first fuel vapor flow port under the control of the roll-over valve means while the flow of fuel vapor through the second fuel vapor flow port is blocked during non-refueling activity.

12. The system of claim 11, wherein the vapor delivery means includes a vapor flow passage, the valve means includes a valve member movable within the vapor flow passage between a first position blocking flow of fuel vapor through the second fuel vapor flow port and a second position permitting flow of fuel vapor through the second fuel vapor flow port, and spring means for yieldably urging the valve member normally to its first position during non-refueling activity, and the vapor recovery means further includes actuation means for selectively moving the valve member against the spring means to its second position to exhaust pressurized fuel vapor from the fuel tank through the second fuel vapor flow port during refueling activity.

13. The system of claim 12, wherein the valve member is formed to include a pressure relief passageway for conducting fuel vapor therethrough, the pressure relief passageway being situated to conduct fuel vapor from the first fuel vapor flow port to the vapor delivery means when the valve member is in its first position.

14. The system of claim 12, wherein the actuation means includes diaphragm means for displacing the valve member between its first and second positions and vacuum means for selectively applying a vacuum to the diaphragm means to move the valve member to its second position so that second fuel vapor flow port is opened, thereby permitting pressurized fuel vapor to flow from the fuel tank toward the fuel vapor treatment site via the vapor delivery means.

15. The system of claim 12, further comprising sensing means for providing an actuation instruction indicative of the beginning of a vehicle refueling activity cycle, the actuation means being responsive to an actuation instruction from the sensing means so that fuel vapor discharged from the fuel tank during each refueling activity cycle is conducted to the fuel vapor treatment site for liquid fuel recovery treatment therein before being discharged to the atmosphere.

16. The system of claim 12, wherein the spring means exerts a predetermined biasing force to urge the valve member to its first position that is in excess of force exerted by fuel in the fuel tank bearing against the valve member during vehicle rollover or the like so that the valve member remains in its first position to prevent fuel in the fuel tank from flowing into the vapor delivery means via the second fuel vapor flow port during a vehicle rollover condition.

17. The system of claim 16, wherein the roll-over valve means includes housing means for covering a portion of the valve member in communication with the fuel tank via the second fuel vapor outlet port to restrict the quantity of fuel bearing against the valve member during a vehicle rollover condition.

18. A system for exhausting fuel vapors from a vehicle fuel system during refueling, the vehicle fuel system including a fuel tank having a filler neck and a separate outlet, the system comprising means for dividing the outlet into separate first and second fuel vapor flow ports, vapor delivery means for providing a vapor flow passage coupling the first and second ports to a fuel vapor treatment site in fluid communication, roll-over valve means for selectively blocking the flow of fuel vapors through the first fuel vapor flow port during vehicle rollover or the like, and vapor recovery means for selectively regulating the flow of fuel vapors through the second fuel vapor flow port, the vapor recovery means including a valve member movable within the vapor flow passage between a first position blocking flow of fuel vapor through the second fuel vapor flow port and a continuum of other positions permitting flow of fuel vapor through the second fuel vapor flow port, bias means for retractably urging the valve member normally to its first position, and actuation means for retracting the valve member against the bias means to move the valve member away from its first position so that pressurized fuel vapor in the fuel tank can be exhausted through at least the second fuel vapor flow port in the fuel tank outlet during vehicle refueling and subsequently recovered at the fuel vapor treatment site.

19. The system of claim 18, wherein the vapor delivery means includes a vent housing having a radially inwardly extending surface formed to include a vent inlet opening communicating with the fuel tank outlet and a vent outlet opening communicating with the fuel vapor treatment site, the radially inwardly extending surface provides a seat surrounding the vent inlet opening, and the dividing means includes nozzle means for conducting fuel vapor from the fuel tank into the vent housing, the nozzle means being configured to define the first fuel vapor flow port and extending through the vent inlet opening into the vent housing to define the second fuel vapor flow port therebetween.

20. The system of claim 18, wherein the actuation means includes a diaphragm, stem means for connecting the diaphragm to the valve member, and vacuum means for applying a vacuum to the diaphragm to move the valve member within the housing between a second fuel vapor port-closing position and a second fuel vapor port-opening position.

21. The system of claim 18, further comprising sensing means for providing an actuation instruction indicative of the beginning of a vehicle refueling activity cycle, the actuation means responding to an actuation instruction from the sensing means causing fuel vapor discharged from the fuel tank during each refueling activity cycle to be conducted to the fuel vapor treatment site for liquid fuel recovery treatment therein before being discharged to the atmosphere.

22. The system of claim 18, wherein the dividing means includes vapor distribution means for discharging a substantially constant volumetric flow rate of fuel vapor from the fuel tank to the vapor delivery means, the vapor distribution means providing the first fuel vapor flow port and cooperating with the fuel tank to define the second fuel vapor flow port in the outlet.

23. The system of claim 22, wherein the second fuel vapor flow port substantially surrounds the first fuel vapor flow part.

24. The system of claim 22, wherein the vapor distribution means includes a hollow valve housing having a longitudinal axis, inlet means for admitting fuel vapor from the fuel tank into the valve housing, and outlet means for discharging fuel vapors from the valve housing, the outlet means being configured to define the first fuel vapor flow port.

25. A vent assembly for mounting in an outlet provided in a wall of a fuel tank having a separate filler neck, the vent assembly comprising
- a hollow housing extending through the outlet, the housing including partition means for dividing an interior region of the housing into first and second chambers, the hollow housing being formed to include inlet means for admitting fuel vapor in the fuel tank into the first chamber and outlet means for exhausting fuel vapor in the second chamber to a point of use, the partition means being formed to include an aperture for coupling the first and second chambers in fluid communication and providing a seat in the second chamber surrounding the aperture,
- a roll-over valve assembly positioned in the first chamber, the roll-over valve assembly including a discharge nozzle having a first outlet for discharging fuel vapors from the first chamber into the second chamber, the discharge nozzle extending into the aperture formed in the partition means in radially spaced relation to the partition means to define a second outlet therebetween for discharging fuel vapors from the first chamber into the second chamber, and a roll-over valve member movable within the first chamber between a first outlet-opening position and a first outlet-closing position, and means for moving the roll-over valve member to its first outlet-closing position in response to tilting the vent assembly during a vehicle rollover or the like to block the flow of fuel vapors through the first outlet during vehicle roll-over conditions,
- a vapor recovery valve assembly positioned in the second chamber, the vapor recovery valve assembly including a vapor recovery valve member formed to include a vent aperture extending therethrough, spring means for yieldably biasing the vapor recovery valve member against the seat provided by the partition means normally to close the second outlet and to position the vent aperture of the vapor recovery valve member in alignment with the first outlet defined by the discharge nozzle so that fuel vapor can be conducted from the first chamber to the second chamber through the first outlet while the second outlet is closed by the vapor recovery valve member subject to operation of the roll-over valve assembly, and
- actuation means for selectively moving the vapor recovery valve member against the spring means to open the second outlet during vehicle refueling so that pressurized fuel vapor in the fuel tank is admitted into the second chamber via the inlet means, first chamber, and second outlet for subsequent distribution to a vapor recovery treatment site at the point of use.

26. The assembly of claim 25, wherein the hollow housing is mounted in the outlet to position the first chamber and the inlet means in the interior of the fuel tank and to position the second chamber and outlet means outside of the fuel tank.

27. The vent assembly of claim 25, further comprising float means for selectively closing the inlet means in response to accumulation of liquid fuel in the fuel tank in excess of a predetermined amount so that liquid fuel is generally unable to enter the first chamber at high liquid fuel levels in the fuel tank, whereby the risk of discharge of liquid fuel through the aperture formed in the partition means is reduced.

28. The vent assembly of claim 25, wherein the hollow housing has a longitudinal axis, the roll-over valve member includes a ball-receiving cup configured to define a first inclined ramp portion, the roll-over valve assembly further includes base means for retaining the roll-over valve member within the first chamber, the base means including a second inclined ramp portion, the base means being coupled to the hollow housing to present the second inclined ramp portion in opposing spaced-apart relation to the first inclined ramp portion of the cup to define a ball-receiving space therebetween, and the moving means includes a ball positioned in the ball-receiving space in substantially camming relation to each of the opposing first and second inclined ramp portions, the ball riding on both ramp portions in a radially outward direction to move the roll-over valve member to its first outlet-closing position in response to tilting the hollow housing about its longitudinal axis during a vehicle rollover.

29. The vent assembly of claim 25, wherein the actuation means includes a diaphragm, stem means for connecting the diaphragm to the vapor recovery valve member, and vacuum means for applying a vacuum to the diaphragm to move the vapor recovery valve member within the second chamber between its second outlet-closing position and its second outlet-opening position.

30. The vent assembly of claim 29, wherein the spring means exerts a predetermined biasing force to urge the vapor recovery valve member to its second outlet-closing position that is in excess of force exerted by liquid fuel in the fuel tank bearing against the vapor recovery valve member during vehicle rollover or the like so that the vapor recovery valve member remains in its second outlet-closing position to prevent liquid fuel in the fuel tank from flowing into the second chamber via the second outlet during a vehicle rollover condition.

* * * * *